Oct. 15, 1929.  R. T. GLASCODINE  1,731,852
RAILWAY OR LIKE PASSENGER VEHICLE
Filed Sept. 1, 1928  3 Sheets-Sheet 1

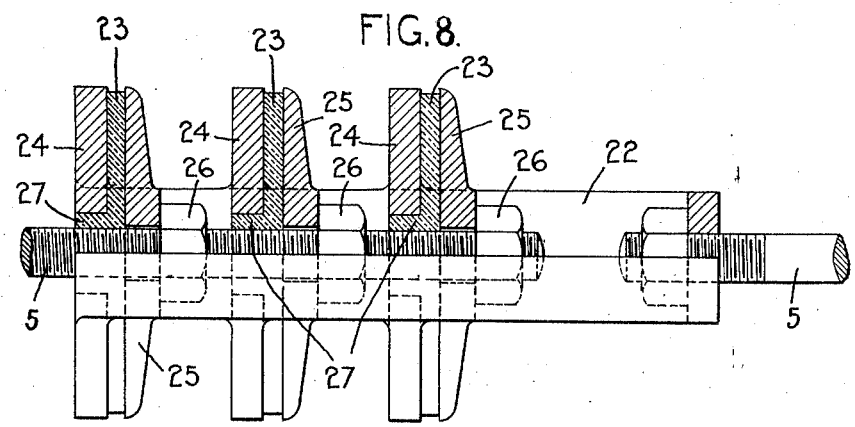
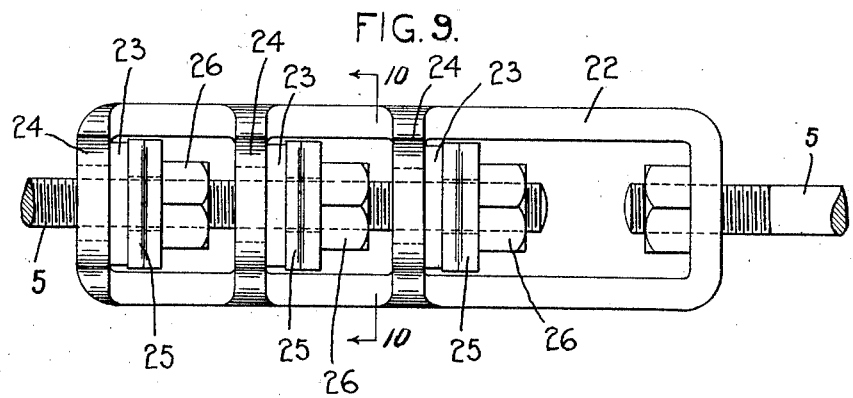
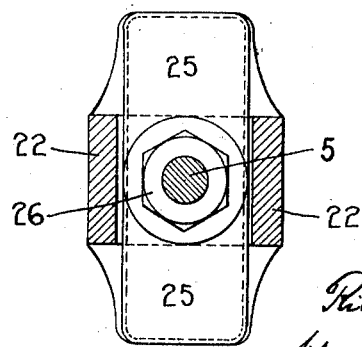

Patented Oct. 15, 1929

1,731,852

UNITED STATES PATENT OFFICE

RICHARD THOMSON GLASCODINE, OF WESTMINSTER, LONDON, ENGLAND

RAILWAY OR LIKE PASSENGER VEHICLE

Application filed September 1, 1928, Serial No. 303,557, and in Great Britain September 5, 1927.

The object of the present invention is to provide in railway or like passenger vehicles means for absorbing vibration in order to increase the comfort of passengers travelling therein.

Adequate means in the way of india-rubber and other springs of various character are embodied in such vehicles for absorbing violent shocks, but it is found that the smaller constant vibratory movement always more or less present when running, especially at high speeds, is not absorbed by the present spring or shock absorbing devices.

The vehicle bodies or the underframes on which they are mounted are built up of or comprise timber and/or steel members placed under stress by means of truss rods and struts and it may be considered that the structure consists of a girder system the members of which are so stressed that they tend to vibrate to some extent after the manner of a musical instrument with both taut wire and sound board, when the vehicle is running, and this vibration is transmitted to the vehicle body with consequent discomfort to the passengers.

To enable full appreciation of the invention the analogy of the stressed girder system to a stringed musical instrument will be clearly seen upon comparing Fig. 1, which diagrammatically illustrates a musical instrument of the violin type, with Fig. 2, which is a diagrammatic side elevation of parts of a vehicle structure. In Fig. 1, the body 1 of the instrument, wire 2 and bridge 3 consists of a system stressed for the very purpose of causing the whole instrument to vibrate upon the slightest provocation. In Fig. 2 the underframe 4, truss rod 5 and struts 6 correspond to the body 1, wire 2 and bridge 3, respectively, of the musical instrument and in like manner the whole system is stressed and is in condition to vibrate under any conditions calculated to give rise to such vibration. The object of the present invention is to nullify these vibrations and to prevent the same occurring in or being transmitted to the vehicle body. This can be effected by the application of india-rubber in any portion of the stressed system in such a way that the mutual stresses of the system are exerted through the india-rubber For example, india-rubber may be applied under the struts 6 (bridge 3) or/and the connections of the truss rod 5 (wire 2) to the underframe 4 (body 1) may be through india-rubber members in compression. In lieu of or in addition to members of rubber at the points of connection of the truss rod to the underframe, the said truss rod may be formed in two or more lengths connected by india-rubber members in compression. Alternatively the making of the underframe 4 (body 1) in two or more longitudinal sections with india-rubber interposed between their juxtaposed ends would serve the same purpose but as will be understood this method of construction would not generally speaking be suitable for railway vehicles.

As the use of india-rubber in the manner stated would entirely "mute" a musical instrument of the kind in question, or in other words destroy its capacity for vibration, so does the application of the india-rubber transform the stressed girder system embodied in the railway vehicle construction into a system suitable only for the purpose for which it is designed, and renders it incapable of vibration after the manner of a musical instrument of the kind in question. This is an advantage of considerable importance and is calculated considerably to increase the comfort of passengers in trains, particularly when travelling at high speeds.

The manner of carrying out the invention will obviously vary according to the design of the vehicle and as found necessary in practice, after due tests and experiments, and the invention is not restricted to any details of construction and arrangement of the india-rubber blocks or pads, care being taken, whatever the arrangement may be, that the quantity of india-rubber employed and the arrangement thereof are such that distortion thereof under load is relatively slight so that there is ample reserve of resiliency to absorb the vibratory movements before referred to, and at the same time avoid definite physical movement as compared with vibration.

As an example, between each strut of the tension rod arrangement and the corresponding member of the vehicle or the underframe upon which the strut abuts, a pad of india-rubber of ample area and suitable thickness may be placed, the adjacent end of said strut being, if necessary, provided with an elongated bearing plate that bears on said pad. The ends of each truss rod are connected to the vehicle or underframe members preferably by means of any required number of suitable blocks of india-rubber through which the rod extends and which are arranged to bear on abutment plates or brackets fixed to the said members.

Referring to the accompanying drawings,—

Figs. 1 and 2 are diagrammatic views already referred to.

Fig. 8 is a side view partially in section showing a modification of the invention. Fig. 9 is a plan view of the parts shown in Fig. 8. Fig. 10 is a cross-section, taken on the line 10—10 in Fig. 9.

Figure 1:
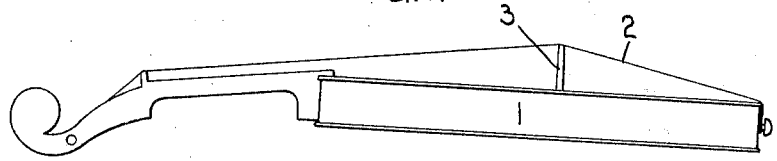
Figure 2:
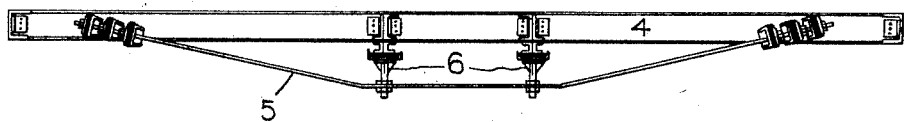
Figure 3:
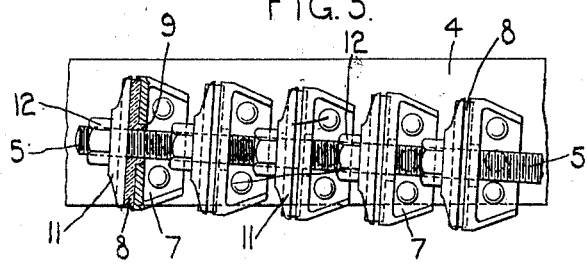
Fig. 3 shows in sectional elevation an arrangement embodying the present invention for connecting an end of a truss rod to a longitudinal member of a vehicle underframe.
Figure 4:
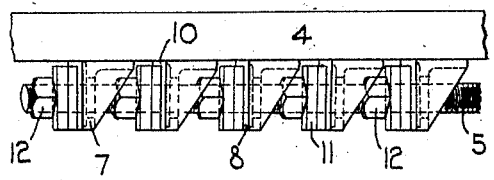
Fig. 4 shows the arrangement in plan, and Fig. 5 in end elevation.
Figure 5:
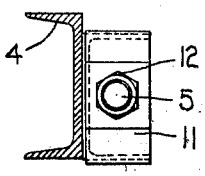

In Figs. 3, 4 and 5 it will be seen that the end portion of the truss rod 5 is screw-threaded and passes through clearance holes in brackets 7 riveted to the longitudinal member 4 of a vehicle underframe. Any desired number of brackets 7 are provided, arranged one behind the other, and the outer face of each of said brackets is formed with a seat for an india-rubber pad 8 having a central hole through which the rod 5 extends. The said india-rubber pad 8 is provided with a boss 9 that fits in the hole in the corresponding bracket 7 and with a lip 10 that lies between the longitudinal member 4 and the adjacent side of a bearing plate 11 which is fitted on the rod 5 and backed by a nut 12. The india-rubber boss 9 prevents any possibility of the metal rod making contact with the metal bracket, and the india-rubber lip 10 prevents the metal bearing plates 11 making contact with the metal longitudinal member 4. It will be understood that by providing a number of brackets 7 fixed to the member 4 and a corresponding number of bearing plates 11 on the rod 5, the pressure necessary to give the desired tension to the rod 5 is divided between the several india-rubber pads 8 interposed between the brackets and the bearing plates.

Figure 6:
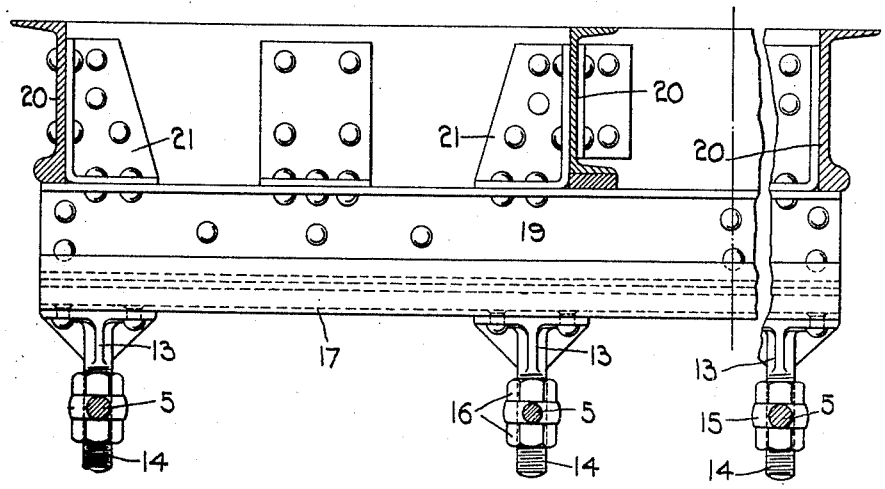
Fig. 6 is a transverse sectional view of a vehicle underframe illustrating an arrangement according to the invention, whereby the struts of the truss rods are connected to the vehicle underframe.
Figure 7:
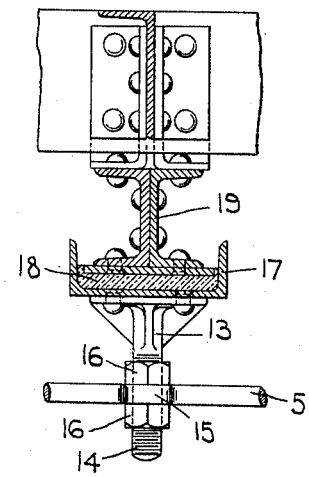
Fig. 7 is a sectional side view of the strut arrangement.

Figs. 6 and 7 show an arrangement whereby the struts of the truss rods 5 bear on the frame through an india-rubber pad. In the example illustrated the frame structure is stiffened by four tension rods 5 longitudinally arranged at equal distances apart. The struts each comprises a flanged bracket 13 having a downwardly extending screw-threaded stem 14 engaged by an eye 15 of the corresponding truss rod 1. Nuts 16 above and below the said eye 15 fix the truss rod in the desired position on the stem 14. The flanged bases of each row of four struts are riveted to a transverse member 17 of channel iron in the channel of which is arranged a pad 18 of india-rubber that extends the full length of the channel iron member 17. Resting on the india-rubber pad 18 is a transverse beam 19 fixed to the longitudinal members 20 of the frame as by brackets 21. The beam 19 forms an elongated bearing plate that rests on the india-rubber pad 18 and the said pad is of such ample area that the distortion thereof under load is relatively slight so that an ample reserve of resiliency is left to absorb vibratory movements. In the modification shown in Figs. 8, 9 and 10, the truss rod 5 is made in two parts or sections connected by a cradle or yoke 22. India rubber pads 23 are interposed between the parts 24 of the cradle or yoke and rectangular washer plates 25 on the truss rod. The washer plates 25 are backed by nuts 26. As will be seen the arrangement is such that the area of the india-rubber pads is such that the distortion of the pads under load is slight, so that there is an ample reserve of resiliency to absorb vibration. The india-rubber pads 23 are formed with india-rubber bosses 27 that engage the holes in the parts 24 of the cradle or yoke.

What I claim is:—

1. A railway or like passenger vehicle comprising a framing which with its truss rods forms a stressed girder system, in which india-rubber is used between the members of the system so as to nullify the tendency to vibration set up in the system.

2. A railway or like passenger vehicle the frame of which comprises members placed under stress by means of truss rods and struts, wherein india-rubber pads or blocks of appropriate bulk and dimensions are located between the members of the frame and the truss rods and struts.

3. A railway or passenger vehicle according to claim 1, wherein the india-rubber is in the form of pads or blocks so arranged and of such substantial area that the distortion thereof under load is relatively slight in order to provide ample reserve of resiliency to absorb vibratory movements.

4. A railway or the like vehicle according to claim 2, wherein the ends of each truss rod are connected to the vehicle frame members by means of brackets fixed to the said members, bearing plates on the truss rod, and india-rubber blocks or pads between the said brackets and bearing plates.

5. A railway or like vehicle according to claim 2 wherein the truss rod is made in sections connected together by cradles containing rubber blocks located between the ends of the cradle and bearing washers on the ends of the truss rod parts connected thereby.

6. A railway or the like vehicle according to claim 2, wherein a pad of india-rubber is arranged between each strut of the truss rod arrangement and the corresponding member of the frame upon which it takes its bearing.

7. A railway or the like vehicle according to claim 2, wherein the struts of a number of truss rods are fixed to a common channel iron member in which is placed a pad of india-rubber on which bears a metal beam fixed to an appropriate member of the frame.

In testimony whereof I affix my signature.

RICHARD THOMSON GLASCODINE.